Oct. 4, 1966 R. MICHEL 3,277,453

APPARATUS AND METHOD FOR RECORDING AND REPRODUCING A PLURALITY OF TIMING TRACKS

Filed Aug. 31, 1962

INVENTOR
RUDOLF MICHEL

BY

ATTORNEY

United States Patent Office 3,277,453
Patented Oct. 4, 1966

3,277,453
APPARATUS AND METHOD FOR RECORDING AND REPRODUCING A PLURALITY OF TIMING TRACKS

Rudolf Michel, Heidenheim (Brenz), Germany, assignor to International Standard Electric Corporation, New York, N.Y., a corporation of Delaware Filed Aug. 31, 1962, Ser. No. 220,798
Claims priority, application Germany, Sept. 9, 1961, St 18,308
3 Claims. (Cl. 340—174.1)

Figure 1:
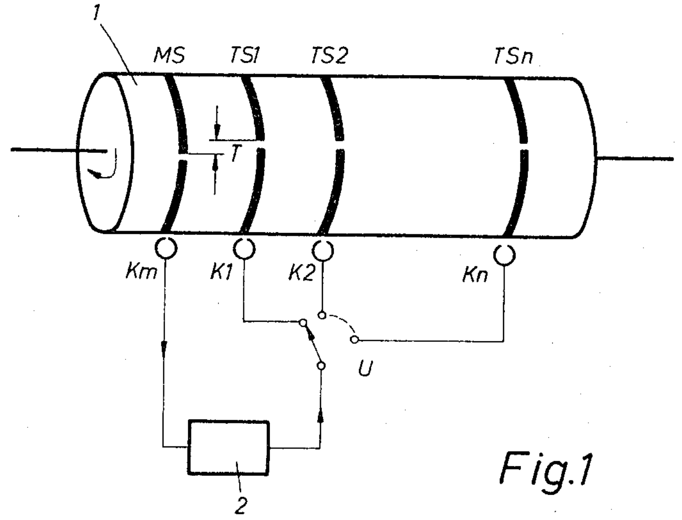

The invention relates to a method to produce time-pulse sequences for magneto-motoric memories, particularly for magnetic drum-type memories.

By the constant increase of the storing capacity and the resulting frequency rise more exacting requirements are demanded from the phase tolerances of the timing pulses. These phase deviations are due for example to drum fluctuations, to unavoidable irregularities in the magnetic layer and similar influences when applying or recording the timing track or timing tracks.

In order to reduce, for example, the influence of skewing of a recording medium on the phase position of the timing pulses when selecting information it is known to arrange several timing tracks distributed over the whole recording medium. To each group of information tracks a predetermined timing track is associated. By this measure, however, the aforementioned influences which cause the phase deviations of the timing pulses, cannot be eliminated but only the influence of skewing.

To find an efficient method in order to reduce the interfering phase deviation influences caused by the drum, and to improve the phase and amplitude stability is the task of this invention.

According to the invention a method to produce timing tracks in magneti-motoric memories, particularly drum-type memories, has been created at which the interfering influences are essentially reduced in that in a first pass a master-timing track is recorded on the drum from which in a second pass several slave tracks are derived. These tracks may be distributed over the entire width of the drum and can be re-recorded at any time. When recording, the magnetic heads of the slave tracks are combined and thus furnish the synchronizing signal to find the information stored.

The method according to the invention further offers the advantage of increased safety against timing track damage through external influences and, at actual timing failure, to regenerate the timing in phase with the former one on the same or on other available tracks without the usual loss of the data already recorded on the drum.

Because the heads are combined when reading out the slave tracks it is possible to eliminate the irregularities in the drum to a large extent. The simultaneous reading-out and the combining of all slave tracks, however, postulates that all slave tracks are recorded on the drum in phase to each other. This can be achieved, for example, in that during the recording of these tracks all heads are excited in parallel by a common generator.

The common feeding of all heads by a common generator requires a very high power of same so the use of high-frequency transistors is impossible; only slower power transistors can be used. The various slave tracks, however, may be derived successively one after the other from the master track in a further development of the invention to make both ends meet with a lower power for the generator.

A suitable apparatus according to the general idea of the invention comprises a magnetic member having a plurality of information recording tracks distributed thereon and a plurality of timing signal tracks interspersed between said information recording tracks, all of said timing signal tracks having recorded thereon timing signal patterns, which are all identical in phase and amplitude, a plurality of sensing elements individually coupled to said tracks and means connected to those sensing elements which are coupled to the said timing signal recording tracks for combining the outputs thereof.

It is well-known to record on a memory a master track and to derive successively from said track individually several slave tracks. Previously it was a problem to amplify an audio-frequency recorded on steel wires for playback by combining the heads of the individual slave tracks. In contrast to the measure known the method according to the present invention serves to obtain an improved signal-to-noise ratio in order to gain a better phase and amplitude stability of the timing signals.

Figure 2:
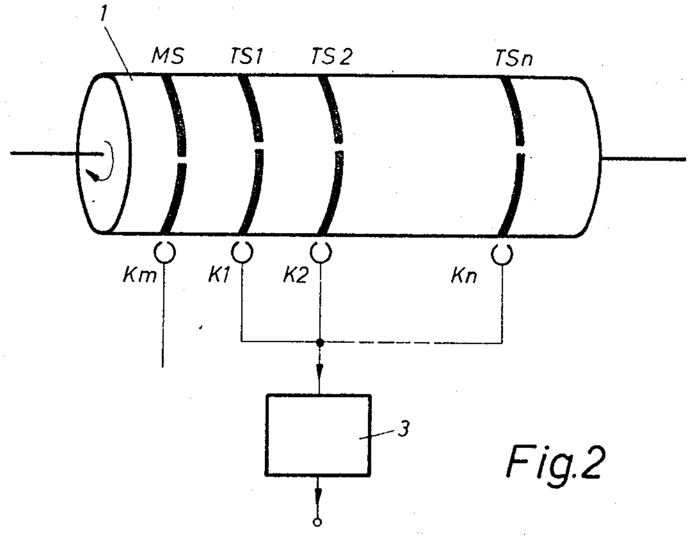

The invention will be more closely explained with the aid of FIGS. 1 and 2.

FIG. 1 shows schematically the derivation of the slave tracks from the master track, and FIG. 2 shows the combination of heads at reproduction.

On the drum 1 the master track MS and the slave track TS1 to TS*n* are represented. The timing signals of the master track will be scanned via head K*m* (FIG. 1) and reach either all heads K1 to K*n* via the pulse shaper 2 simultaneously or they are led first to a switch U and from there to the individual heads, enabling to record the slave tracks either simultaneously or successively onto the drum 1. The signals of the individual slave tracks have, compared with the master track, a certain delay T caused by the delay time when recording.

When reproducing (FIG. 2), during normal operation of the drum, the magnetic head K*m* of the master track MS is switched-off in order to avoid any damage of the original signals on the master track by probable interfering signals on the lines. The heads K1 to K*n* of the slave tracks TS1 to TS*n* are combined (either in series, or in parallel, or series-parallel) and furnish the timing signals to the output via output amplifier 3.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. The recording method comprising the steps of recording a master timing track on a magnetic drum during a first revolution of the drum, reading the recorded master timing track from the drum and simultaneously recording a plurality of slave tracks upon the drum, and additively combining the signals from simultaneously read slave tracks to generate a synchronizing signal for finding information stored in the memory.

2. The recording method comprising the steps of recording a master timing track on a magnetic drum during a first revolution of the drum, reading the recorded master track from the drum in successive drum revolutions and successively recording the master track signals as a plurality of slave tracks on the drum, and additively combining the signals from simultaneously read slave tracks to generate a synchronizing signal for locating information stored in the memory.

3. A magneto-motoric memory system comprising a magnetic member having a plurality of information recording tracks distributed thereon and a plurality of timing signal tracks interspersed between said information recording tracks, all of said timing signal tracks having recorded thereon timing signal patterns, which are all identical in phase and amplitude, a plurality of sensing elements individually coupled to said tracks and means connected to those sensing elements which are coupled to the said timing signal recording tracks for additively combining the outputs thereof.

References Cited by the Examiner

UNITED STATES PATENTS

| | | | |
|---|---|---|---|
| 2,813,259 | 11/1957 | Burkhart | 340—174.1 |
| 2,937,239 | 5/1960 | Garber et al. | 340—174.1 |
| 3,041,585 | 6/1962 | Wolfe | 340—174.1 |
| 3,185,970 | 5/1965 | Cromleigh et al. | 340—174.1 |

BERNARD KONICK, *Primary Examiner.*

IRVING L. SRAGOW, *Examiner.*

A. I. NEUSTADT, *Assistant Examiner.*